(12) United States Patent
Kubo et al.

(10) Patent No.: US 6,728,558 B1
(45) Date of Patent: Apr. 27, 2004

(54) PORTABLE TELEPHONE APPARATUS AND CONTROL METHOD THEREOF

(75) Inventors: Tetsuya Kubo, Kanagawa (JP); Teruo Nanmoku, Kanagawa (JP); Mamoru Yoshida, Kanagawa (JP); Kuniko Onozuka, Kanagawa (JP); Naokazu Nagasawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 177 days.

(21) Appl. No.: 09/685,717

(22) Filed: Oct. 11, 2000

(30) Foreign Application Priority Data

Oct. 15, 1999 (JP) .............................. 11-294011
Oct. 25, 1999 (JP) .............................. 11-302974

(51) Int. Cl.⁷ .............................................. H04M 1/00
(52) U.S. Cl. ................... 455/575.4; 455/575.1; 455/564; 341/22; 341/23; 245/168; 245/169
(58) Field of Search .......................... 455/564, 90, 575, 455/550; 379/433.01, 440, 428; 341/22, 23; 345/168, 169

(56) References Cited

U.S. PATENT DOCUMENTS

| | | | | |
|---|---|---|---|---|
| 5,491,745 A | * | 2/1996 | Roeder | 379/355.09 |
| 5,966,671 A | * | 10/1999 | Mitchell et al. | 455/575 |
| 6,037,027 A | * | 3/2000 | Nakano et al. | 283/101 |
| 6,073,027 A | * | 6/2000 | Norman et al. | 455/550 |
| 6,226,501 B1 | * | 5/2001 | Weadon et al. | 455/90 |
| 6,282,436 B1 | * | 8/2001 | Crisp | 455/575 |
| 6,463,262 B1 | * | 10/2002 | Johnson et al. | 455/90 |

FOREIGN PATENT DOCUMENTS

| | | |
|---|---|---|
| EP | 0 813 138 | 6/1997 |
| GB | 2 275 587 | 8/1994 |
| GB | 2 278 756 | 12/1994 |
| GB | 2 321 824 | 8/1998 |
| GB | 2 349 292 | 10/2000 |
| JP | 4223740 | 8/1992 |
| JP | 9289541 | 11/1997 |
| JP | 10215306 | 8/1998 |

* cited by examiner

*Primary Examiner*—William Trost
*Assistant Examiner*—Danh C Le
(74) *Attorney, Agent, or Firm*—Pearne & Gordon LLP

(57) ABSTRACT

When the key operation area is pressed, a decision is made about whether the key is pre-registered a single button dialing telephone number or not (step 3). In case a decision is made that a single button dialing telephone number is pre-registered to the key in step 3, the timer starts when the key is pressed (step 6). In case the key is held down for the predetermined period (T1), an operation to instruct single button dialing via a so-called hold-down operation is assumed, thus causing the single button dialing telephone number pre-registered to the key held down to appear on the display (step 8). When a predetermined period (T2) has elapsed with the key held down (step 9), an operation to instruct a call origination to the telephone number on the display is assumed and a call is originated then conversation starts depending on the answer of the distant party (step 10).

14 Claims, 9 Drawing Sheets

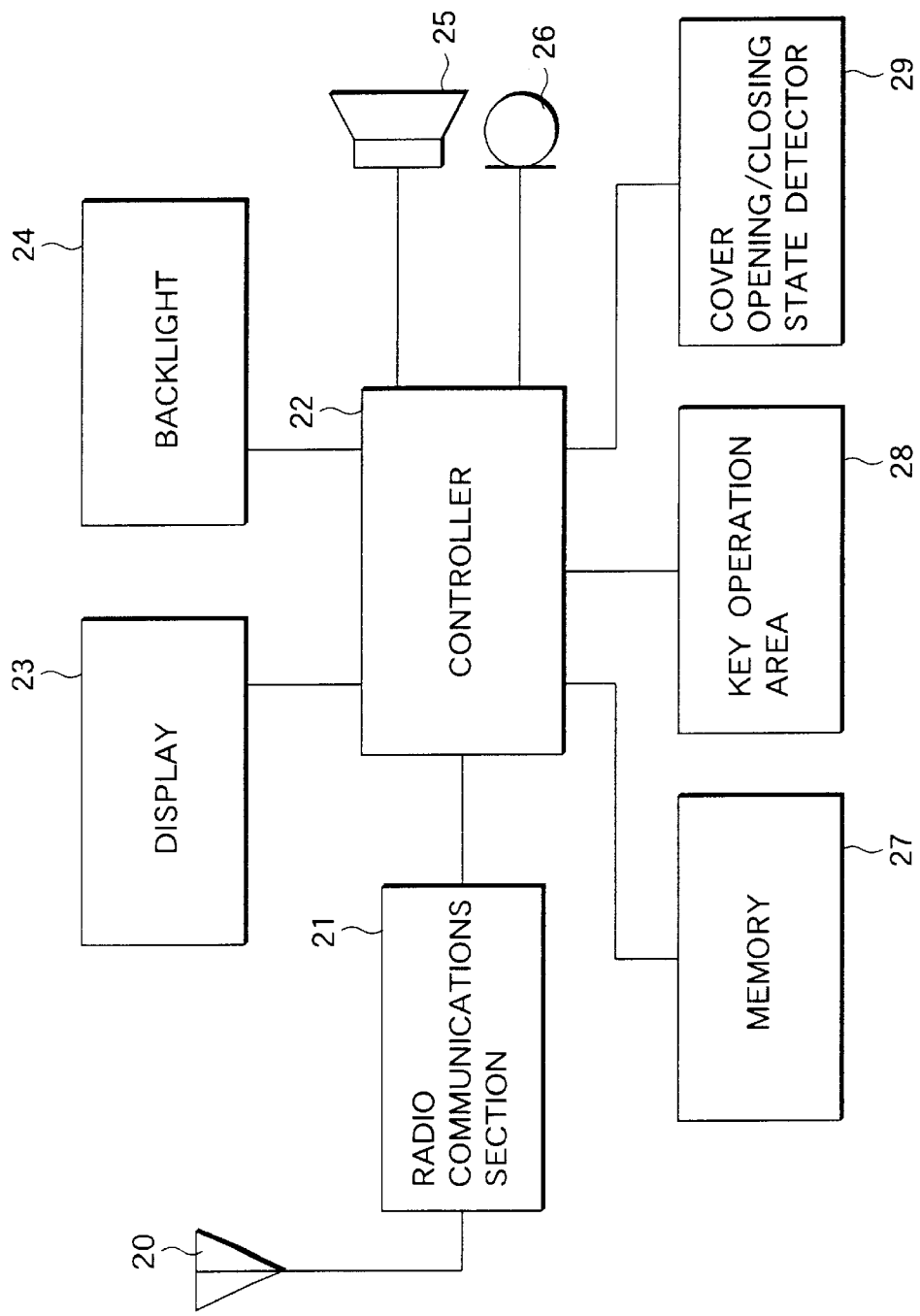

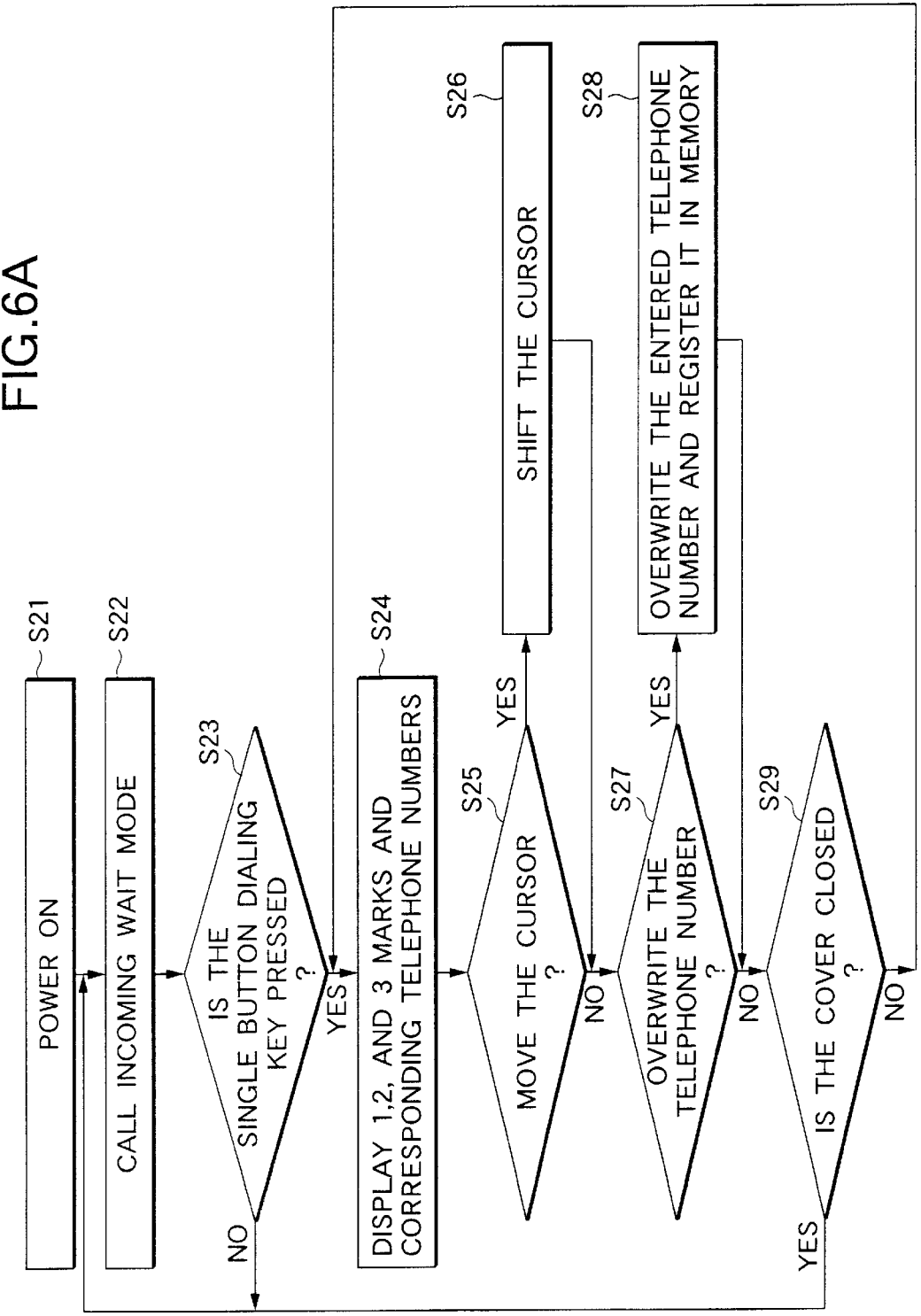

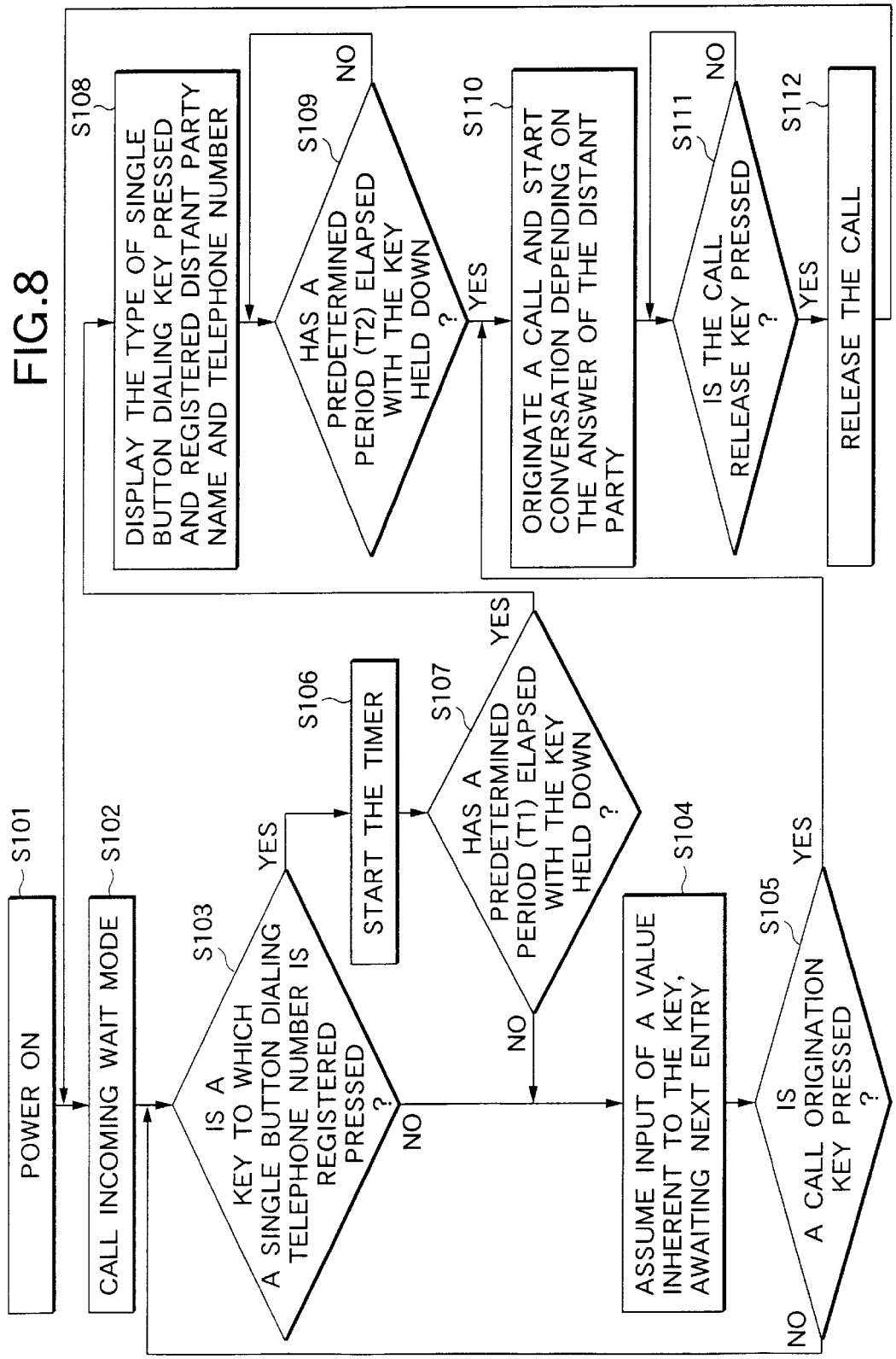

PORTABLE TELEPHONE APPARATUS AND CONTROL METHOD THEREOF

BACKGROUND OF THE INVENTION

The present invention relates to portable telephone apparatus such as a cellular phone and a PHS (Personal Handyphone System) terminal having the single button dialing feature.

For conventional portable telephone apparatus such as a portable telephone set and a PHS terminal, the user registers distant party telephone numbers in the electronic directory of the built-in storage in advance, and originates a call by retrieving a desired distant party telephone number by scroll-key.

Recently, portable telephone apparatus such as a portable telephone sets and a PHS terminal has spread among a wide range of users. For children in lower grades of an elementary school, it is convenient via portable telephone terminal to be able to easily make contact with a small number of specific distant parties, for example between children and their guardians, between children and their school or between children and nearby relatives such as their grandparents. For elderly,people also, it is convenient via portable telephone terminal to be able to easily make contact with a small number of specific distant parties.

SUMMARY OF THE INVENTION

The present invention is to provide a portable telephone apparatus whereby the user can originate a call without fail, via a simple operation, to a desired distant party among the pre-registered small number of distant parties, and control method thereof.

According to first aspect of the invention, a portable telephone apparatus is equipped with two or more single button dialing keys and that the user can originate a call to the distant party having the telephone number pre-registered for a single button dialing key by holding down the single button dialing key for at least a predetermined period. Via this configuration, it is possible to originate a call to a pre-registered distant party via a simple operation.

According to the second aspect of the invention, the portable telephone apparatus is equipped with the single button dialing keys provided on the external surface of an openable enclosure cover and in that the user can originate a call to the distant party having the pre-registered telephone number by operating the single button dialing key while the cover is closed. Via this configuration, it is possible to originate a call by using single button dialing keys while the cover is closed.

According to the third aspect of the invention, the portable telephone apparatus comprises an enclosure having a slidable cover, transmitter means, receiver means, radio communications means, key entry means, control means, storage means, and cover opening/closing state detecting means and that one or more operations to be performed when the slidable cover is opened or closed are stored in the storage means, in order for one or more operations stored in the storage means to be performed when the cover opening/closing state detecting means has detected closing of the cover from the open state or opening of the cover from the closed state. Via this configuration, it is possible to perform an operation pre-registered in storage means by simply opening or closing the slidable cover.

According to the fourth aspect of the invention, the control means makes control to reduce the volume of a ringing tone when the cover opening/closing state detecting means has detected opening of the sliding cover from the closed state. Via this configuration, it is possible to reduce ringing by opening the cover.

According to the fifth aspect of the invention, the control means makes control to illuminate display means when the cover opening/closing state detecting means has detected opening of the sliding cover from the closed state. Via this configuration, it is possible to illuminate the display means by opening the cover.

According to the sixth aspect of the invention, the control means makes control to perform call release operation when the cover opening/closing state detecting means has detected closing of the sliding cover from the open state. Via this configuration, it is possible to perform call release operation by closing the cover.

According to the seventh aspect of the invention, the cover opening/closing state detecting means is composed of a combination of a lead switch and a magnet and that the magnet comes in close proximity to the lead switch to turn on/off the lead switch when the cover is closed. Via this configuration, it is possible to detect closing of the cover from the open state and opening of the cover from the closed state.

According to the eighth aspect of the invention, a control method for portable telephone apparatus in that an operation key which is pre-assigned an input signal is further assigned a single button dialing telephone number separately from said input signal, that said input signal is assumed to be input when said operation key is held down shorter than a predetermined period, and that a single button dialing instruction signal is assumed to be input when said operation key is held down longer than the predetermined period to originate a call to a pre-registered single button dialing telephone number. Via this configuration, it is possible to originate a call to a pre-registered distant party via a simple operation.

According to the ninth second aspect of the invention, a control method for portable telephone apparatus in that an operation key which is pre-assigned an input signal is further assigned a single button dialing telephone number separately from said input signal, that said input signal is assumed to be input when said operation key is held down shorter than a first predetermined period (T1), that a single button dialing instruction signal is assumed to be input when said operation key is held down longer than the first predetermined period (T1) to display a pre-registered single button dialing telephone number, and that a call is originated to the displayed single button dialing telephone number when a second predetermined period (T2) has elapsed after the elapse of said first predetermined period (T1). Via this configuration, it is possible to automatically display a registered single button dialing telephone number and to originate a call to the displayed single button dialing telephone number in a sequence, by the elapse of the period the operation key is held down.

According to the tenth aspect of the invention, a portable telephone apparatus controlled by the control method as mentioned above. Via this configuration, it is possible to provide portable telephone apparatus whereby it is possible to originate a call easily by using single button dialing keys.

According to the eleventh aspect of the invention, the control means comprises an enclosure having an openable cover, transmitter means, receiver means, radio communications means, key entry means, storage means, and display means, that said openable cover is equipped with a pressing area to press the key entry means provided on said enclosure from the cover surface, and that a call is originated to a pre-registered single button dialing telephone number by holding down an operation key to which the single button dialing telephone number is registered apart from said input signal, via said pressing area of the cover while the cover is closed. Via this configuration, it is possible to originate a call to a pre-registered single button dialing telephone number while the cover is closed.

BRIEF DESCRIPTION OF THE DRAWINGS

FIG. 3 is a block diagram of portable telephone apparatus according to the embodiment of the invention;

FIGS. 6A and 6B are flowcharts for portable telephone apparatus according to the embodiment of the invention;

FIG. 8 is a flowchart for explaining the operation of holding down a single button dialing key to originate a call to a desired distant party.

DETAILED DESCRIPTION OF THE PREFERRED EMBODIMENTS

First Embodiment

A first embodiment of the invention will be explained with reference to FIGS. 1 through 7.

Figure 1A:
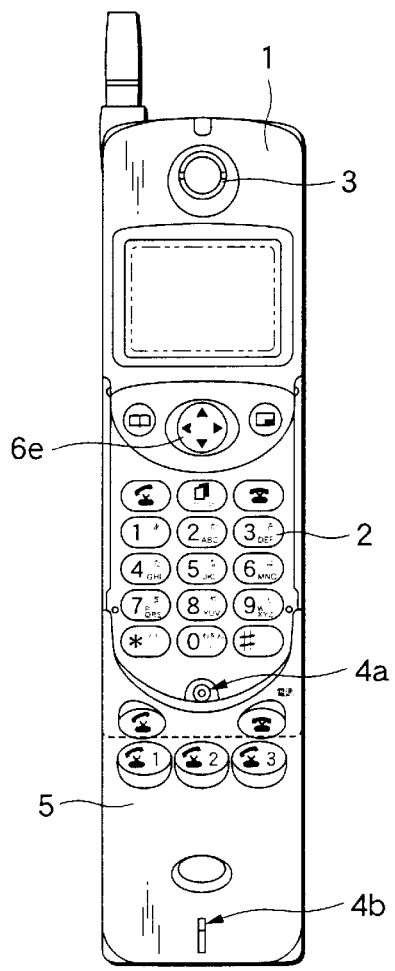
FIGS. 1A to 1C are views of a configuration of portable telephone apparatus according to the embodiment of the invention.
Figure 1B:
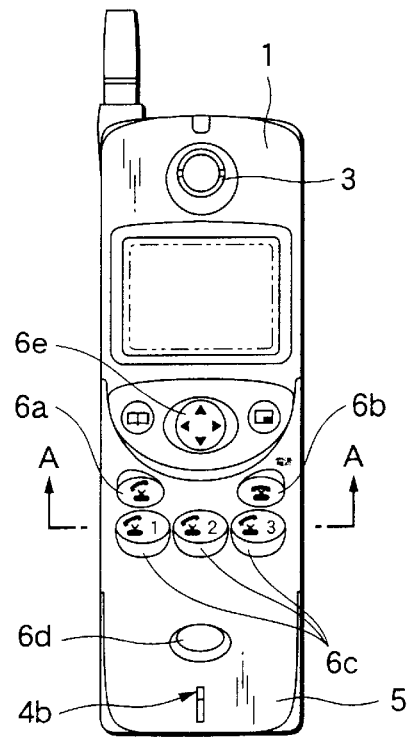
Figure 1C:
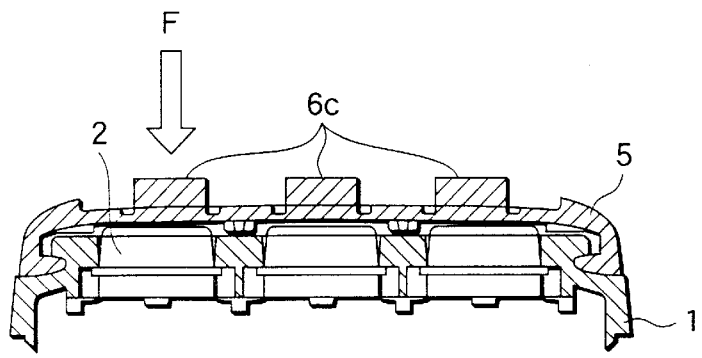
Figure 2A:
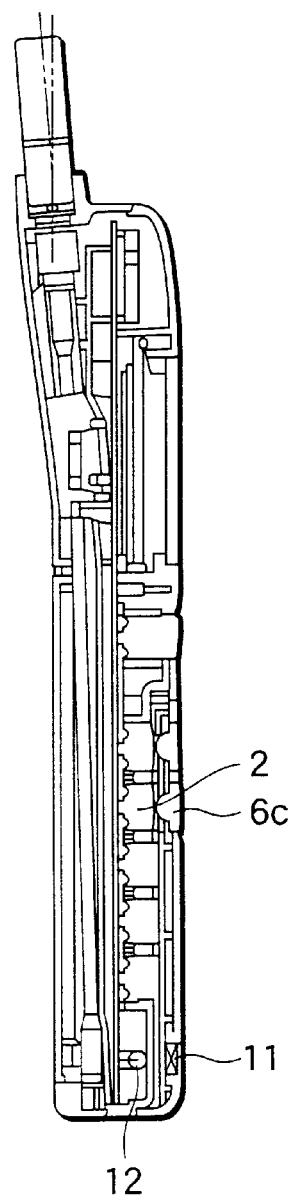
FIGS. 2A and 2B are side views and a cross-sectional view of a configuration of portable telephone apparatus according to the embodiment of the invention.
Figure 2B:
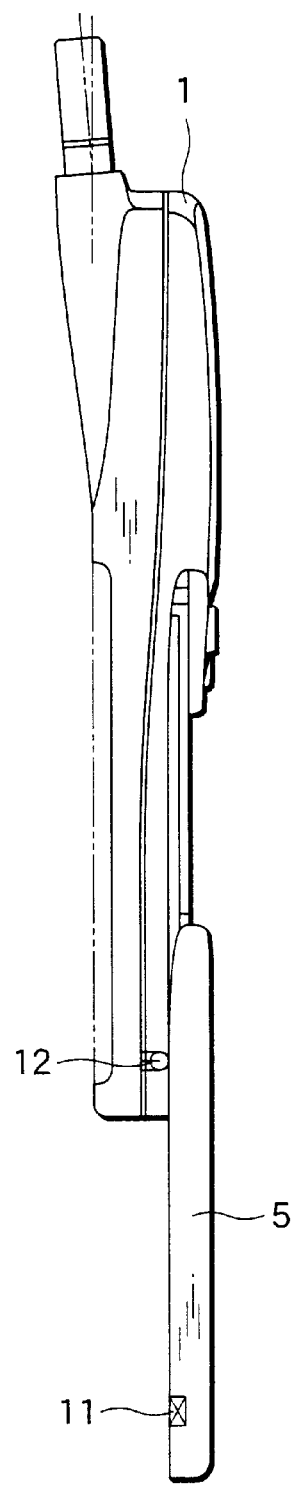

FIGS. 1A to 1C are views of a configuration of portable telephone apparatus according to the embodiment of the invention that comprises a sliding cover 5 capable of sliding against a main unit enclosure 1. FIG. 1A is a front view of the portable telephone apparatus with its sliding cover 5 open. FIG. 1B is a front view of the portable telephone apparatus with its sliding cover 5 closed. FIG. 1C is a cross-sectional view (A—A) of FIG. 1A. FIG. 2A is a side view of the portable telephone apparatus according to the embodiment of the invention with its sliding cover 5 open. FIG. 2B is a cross-sectional view of the portable telephone apparatus with its sliding cover 5 closed.

Configuration of the portable telephone apparatus will be briefly explained with reference to FIGS. 1A to 1C and FIGS. 2A and 2B. The main unit enclosure 1 is equipped with a key operation area 2, a receiver 3, a transmitter 4 (including a first mouthpiece 4a and a second mouthpiece 4b) and a lead switch 12.

The sliding cover 5 is equipped with a magnet 11 on its rear side and on the external surface of the sliding cover 5 are arranged a call start key 6a and a call release key 6b side by side, below which three single button dialing keys 6c in a row, below which an automatic answering setup key 6d.

When the cover 5 is closed, the magnet 11 is brought overlaid on the lead switch 12 to turn on the lead switch 12. Under the cover electrically closed, pressing a single button dialing key 6c provided on the external surface sliding cover 5 causes the bottom of the single button dialing key 6c to lower thereby pressing a corresponding ten-digit button on the main unit enclosure 1 beneath the cover 5, as shown in FIG. 1C. Thus, pressing these keys provided on the external surface sliding cover 5, causes corresponding ten-digit buttons on the main unit enclosure 1 beneath the cover 5 to be pressed, thereby transferring the operation instruction for call start, call release, single button dialing, or automatic answering setup to the controller.

Figure 5A:
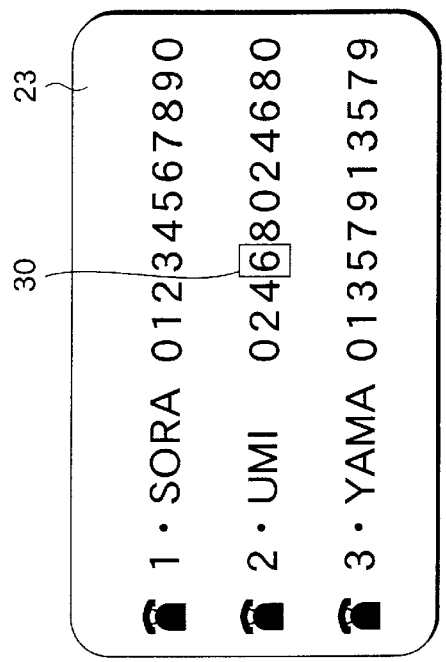
FIGS. 5A to 5D are transition diagrams of the display of portable telephone apparatus according to the embodiment of the invention.

Holding down a ten-digit button on the main unit enclosure 1 beneath the cover 5 from the external surface of the cover 5 transfers the operation instruction for call start, call release, single button dialing, or single button dialing detail display. Pressing the single button dialing details display key (an automatic answering setup key) 6d displays the details registered to three single button dialing keys 6c, for example as shown in FIG. 5A. The key 6e is a scroll key for moving the cursor or items to appear on the display.

FIG. 3 is a block diagram of portable telephone apparatus according to the embodiment of the invention. In FIG. 3, radio waves coming from an antenna 20 are received by the receiver (not shown) of a radio communications section 21 and received information is transferred to a controller 22. The controller 22 illuminates the display 23 using a backlight 24 via setting. The controller 22 also converts received information to voice information and outputs the voice information from a speaker 25 of the receiver.

The transmitter (microphone) 26 transfers the user's voice to the controller 22 and transmits the information to the distant party via a transmitter (not shown) of the radio communications section 21 and the antenna 20. The controller 22 stores information such as single button dialing telephone numbers in a memory 27 or reads necessary information therefrom.

A key operation area 28 composed of a ten-digit keypad and a scroll key is adapted to input signals to the controller 22 via key operation and to store telephone number information for single button dialing in the memory 27. A cover opening/closing state detector 29 that is composed of a lead switch 12 and a magnet in FIG. 1 detects the cover opening/closing state as well as transfers detected information to the controller 22.

In the memory 27 are stored control programs for various operations including single button dialing display operation, single button dialing edit operation, answer operation, ringing volume reduction operation, and backlight illuminating operation. The user selects operations to be performed when the cover is opened/closed in advance and registers selected operations in the memory 27 for desired operations.

Figure 4:
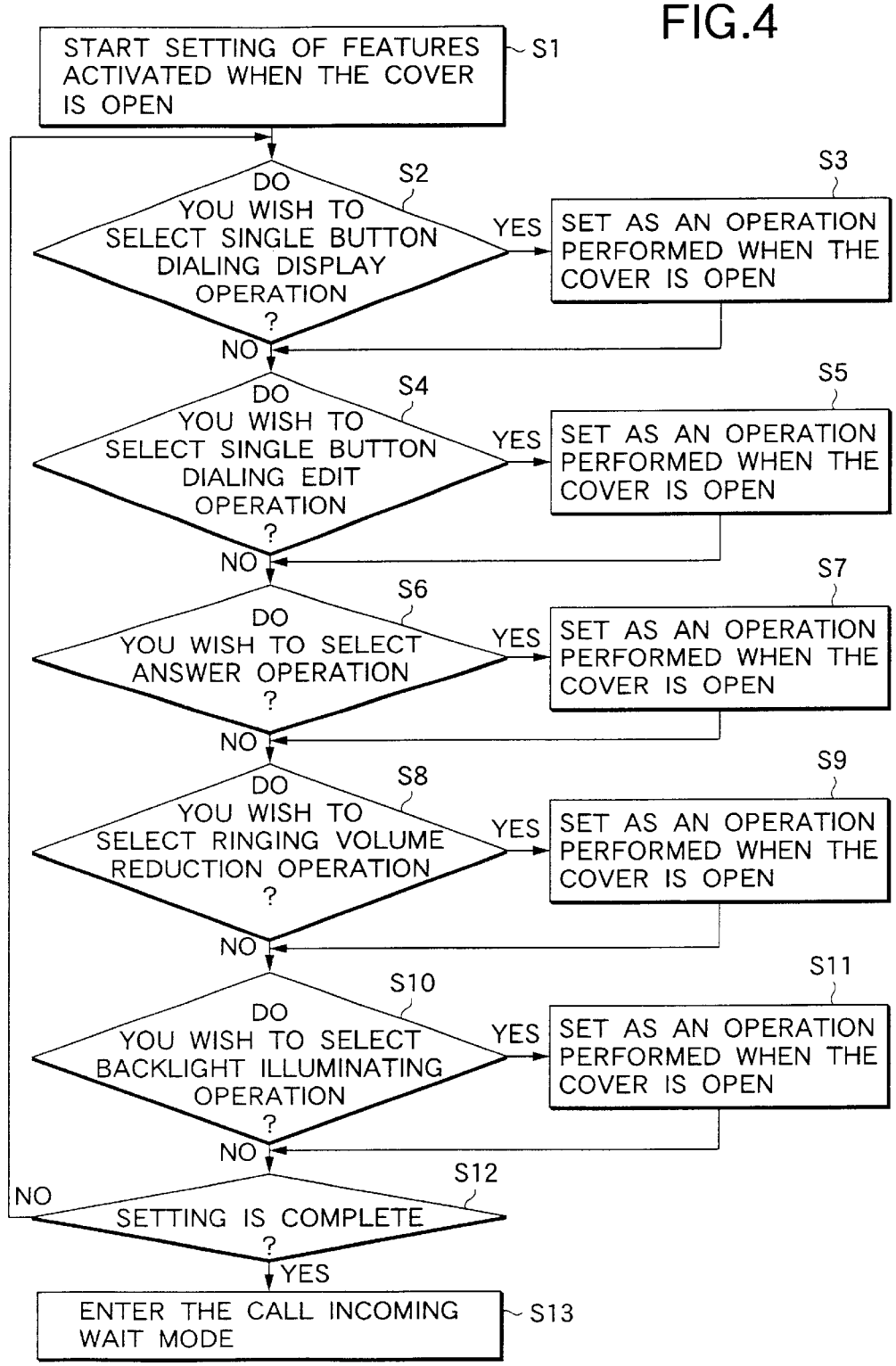
FIG. 4 is a flowchart for registering operations of portable telephone apparatus according to the embodiment of the invention.

FIG. 4 shows a procedure for setting operations to be performed when the cover is open. After power on, when the portable telephone apparatus has entered the feature setting mode from the call incoming wait mode (step 1), a question "Do you wish to select single button dialing display operation?" appears on the display 23. The operator enters Yes or No from the key operation area 28 (step 2). In case Yes is selected, the information is registered in the memory 27 as operation performed when the cover is opened (step 3). This setting displays information such as telephone numbers registered as single button dialing information on the display 23 as shown in FIG. 5(a), when the cover is opened during the call incoming wait mode. In case No is selected, execution goes to next step.

Then a question "Do you wish to select single button dialing edit operation?" appears on the display 23. The operator, same as step 2, enters Yes or No from the key operation area 28 (step 4). In case Yes is selected, the information is registered in the memory 27 as operation performed when the cover is opened (step 5). As mentioned later, this setting displays telephone numbers registered as single button dialing information on the display 23 when the cover is opened during the call incoming wait mode, allowing overwriting of registered telephone numbers or registration of new telephone numbers via subsequent key entry. In case Yes is selected in both step 2 and step 4, control is made to perform single button dialing operation when the cover is opened and then to perform single button dialing edit operation.

Then, as shown in the flowchart, in response to questions "Do you wish to select answer operation?" (step 6), "Do you wish to select ringing volume reduction operation?" (step 8), and "Do you wish to select backlight illuminating operation?" (step 10) posed one after another as operations to be performed when the cover is opened, the user enters Yes or No. In case the user has enters Yes for certain operations, the selected operations are performed when the cover is opened. To correct entry in the setting procedure, the user returns to the previous screen (step 12) and enters Yes or No again. When setting is complete (step 12) the portable telephone apparatus returns to the call incoming wait mode. Operations to be performed when the cover is closed are registered via a similar procedure. For example, call release operation to be performed when the cover is closed during conversation with the cover open.

Figure 6B:
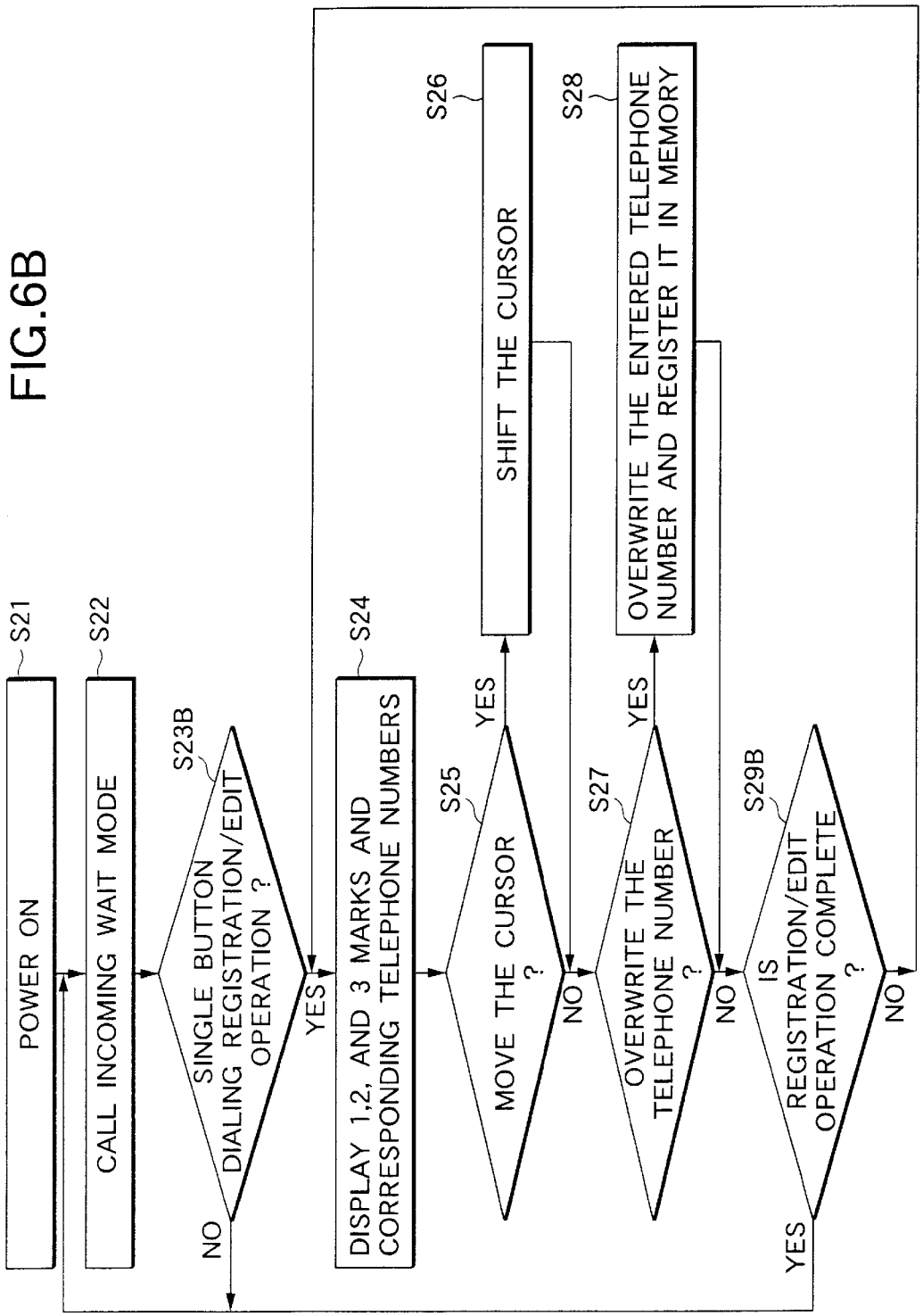

Next, the case where single button dialing registration and edit operation is selected as an operation to be performed when the cover is opened will be explained with reference to the flowchart in FIG. 6A. The portable telephone apparatus, once powered on (step 21), enters the call incoming wait state (step 22). When the cover is opened (step 23), telephone marks including TEL 1, TEL 2, and TEL 3 and their registered distant party names, such as "SORA" and the telephone number 01234567890 appear on the display 23, as shown in FIG. 5A.

Figure 5C:
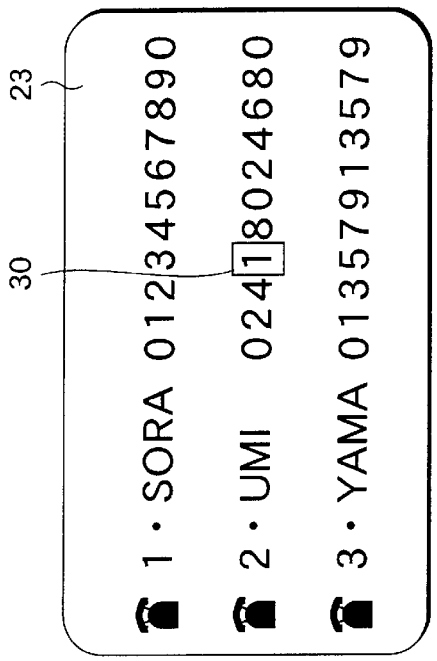
Figure 5B:
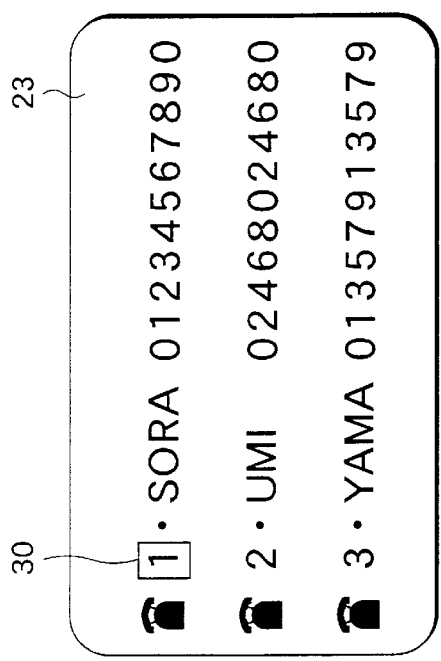
Figure 5D:
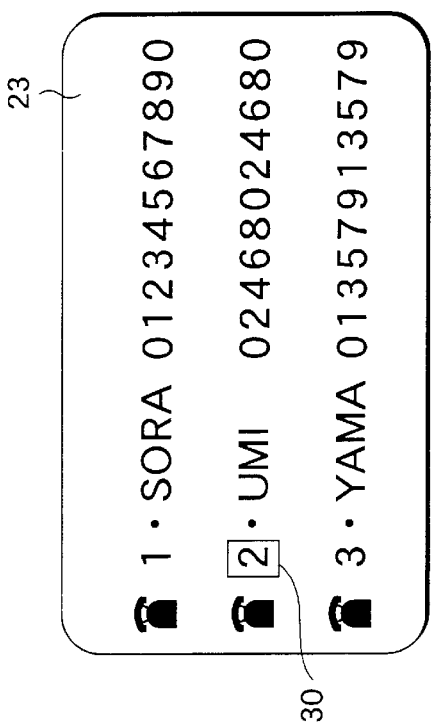

The following explains an exemplary case where the telephone number of TEL 2 as a single button dialing telephone number is overwritten. As shown in FIG. 5B, the user presses the down arrow on the scroll key (6e in FIG. 1A) in the key operation area 28 (step 25) and moves the cursor 30 of the display 23 to the telephone number of TEL 2 as a single button dialing telephone number (step 26). As shown in FIG. 5C, with the cursor 30 of the display 23 placed at the telephone number of TEL 2 as a single button dialing telephone number, the user presses the right arrow on the scroll key and moves the cursor 30 to the target digit of the telephone number then presses the ten-digit keypad 2 in the key operation area 28 to overwrite the information (step 27). Overwritten information is sequentially registered in the memory 27 (step 28). When wishing to overwrite other single button dialing telephone numbers, the user moves the cursor 30 to the target single button dialing telephone number on the display 23 and enters new data via the ten-digit keypad 2.

When the cover is closed, the lead switch 12 as the cover opening/closing state detector 29 detects closing of the cover via the magnet 11 of the cover 5 and transfers the information to the controller 22. This returns the portable telephone apparatus to the call incoming wait state. Via the aforementioned operations, distant party names and/or telephone numbers are registered to single button dialing telephone numbers or existing distant party names and/or telephone numbers are overwritten.

In the above embodiment, opening and closing of the slide cover is used to start and complete the single button dialing registration-and-edit operation. On the other hand, the user may open the feature menu of the portable telephone apparatus to enter the single button dialing registration-and-edit mode (step 23B). By entering completion of registration-and-edit operation (step 29B), the portable telephone apparatus returns to the call incoming wait state. Via such an operation, destination names and telephone numbers of single button dialing may be registered in the memory 27 or overwritten.

Figure 7:
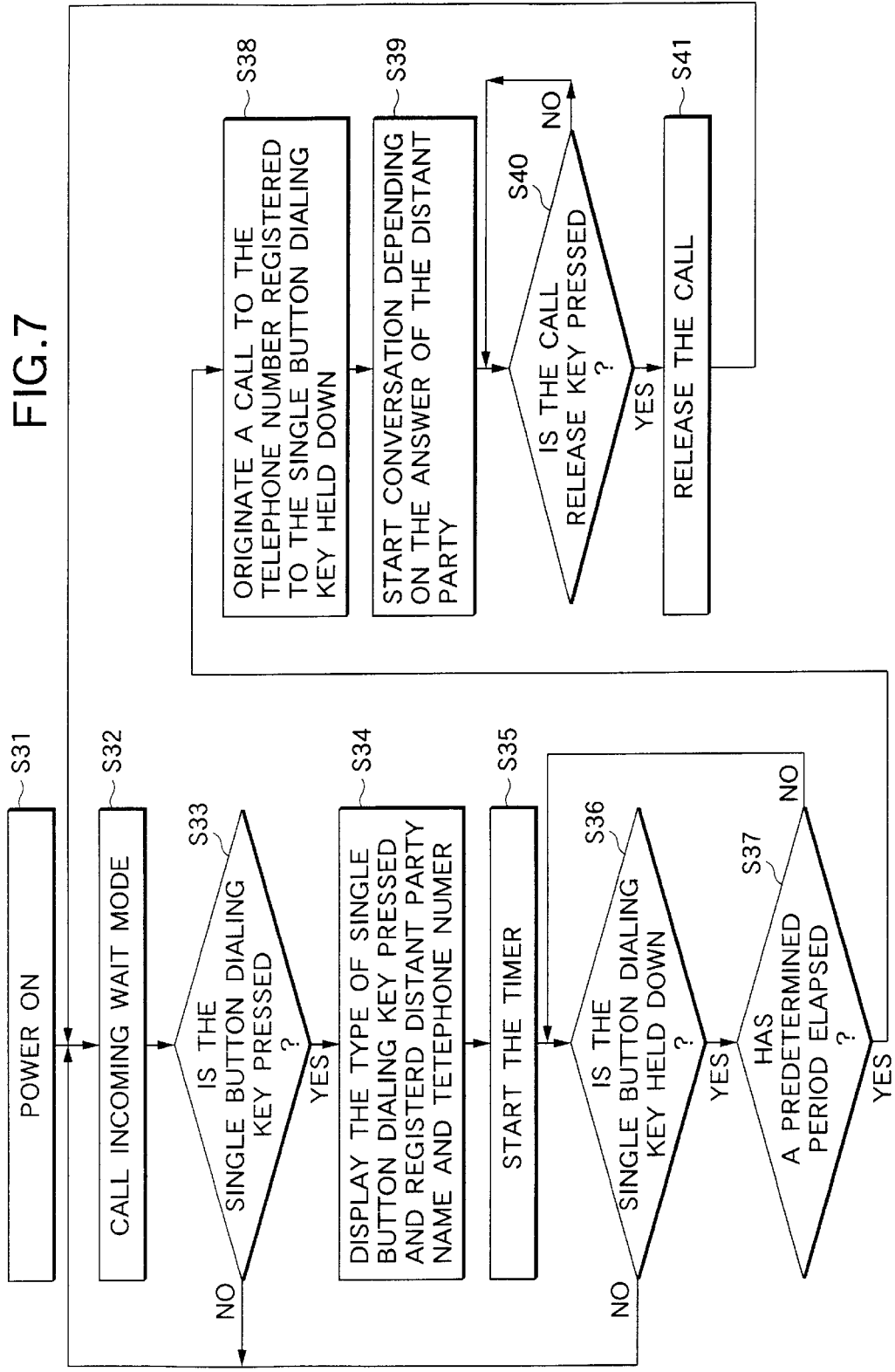
FIG. 7 is a flowchart for portable telephone apparatus according to the embodiment of the invention.

The sequence of pressing a single button dialing key 6c to originate a call will be explained with reference to the flowchart in FIG. 7. The portable telephone apparatus, once powered on (step 31), enters the call incoming wait state (step 32). In this state, when any of single button dialing keys 6c (FIG. 1A) is pressed (step 33), the type of the single button dialing key, that is, Key 1, Key 2 or Key 3 and the corresponding registered distant party name and the telephone number appear on the display (step 34). The controller 22 starts the timer (step 35). In case the state where a single button dialing key is held down, a so-called hold-down state is suspended, the display in step 34 is canceled and the portable telephone apparatus returns to the call incoming wait state in step 32 (step 36). When a predetermined time has elapsed in the so-called hold-down state (step 37), call origination is made to the telephone number on the display 23 (step 38). When the distant party answers the call, conversation starts (step 39). When the call release key 6b (FIG. 1A) is pressed (step 40), call release operation is performed to release the circuit (step 41).

As mentioned earlier, the portable telephone apparatus according to the invention secures call origination to a desired distant party among a small number of distant parties pre-registered via a simple operation of holding down one of the single button dialing keys 6c provided on the external surface of the cover for at least a predetermined period. Telephone numbers of the distant parties can be checked by opening the cover 5 and displaying the registration. Registration and correction of the telephone numbers are possible by using the key operation area 2.

For use by For a child in lower grades of an elementary school, pressing TEL 1 calls his/her home; pressing TEL 2 calls his/her school; pressing TEL 3 calls his/her grandfather or grandmother in the neighborhood. A child may check registered distant parties by opening the cover. Thus, almost the entire key operation area is lidded by a cover. Only single button dialing keys 6c as a mandatory operation tool appear on the external surface of the cover. Checkup of single button dialing registration is possible by simply opening the cover. The invention provides such simple-to-use, convenient portable telephone apparatus.

The guardian may register only the single button dialing display operation as an operation to be performed when the cover is opened. By doing so, the child can check the distant party to which the registered telephone number corresponds, which he/she has forgotten while preventing the child from inadvertently overwriting the registered telephone number.

The portable telephone apparatus according to the invention is thus simple to operate. The user may register the house to the child in charge of nursing as a distant party for TEL 1; a nearby hospital as TEL 2; and an emergency center as TEL 3. Via such setting, the portable telephone apparatus according to the invention can be used as simple-to-operate portable telephone apparatus for elderly people.

Preferably, when opening of the sliding cover from the closed state is detected, the portable telephone apparatus may reduce the volume of ringing, thereby providing an advantage of quickly reducing ringing that offends those around the user by opening the cover.

Further, when opening of the sliding cover from the closed state is detected, the portable telephone apparatus may illuminate the display means, thereby providing an advantage of illuminating the display means by opening the cover.

Furthermore, when closing of the sliding cover from the open state is detected, the portable telephone apparatus perform call release operation, thereby providing an advantage of performing call release operation by closing the cover.

While the foregoing embodiment of the invention assumes a sliding cover as an openable cover, single button dialing keys may be provided on the external surface of a flip-type openable cover. Single button dialing keys may be provided on the main unit enclosure, not on the external surface of the cover, in case the main unit enclosure has space for arranging the single button dialing keys.

Second Embodiment

The sequence of pressing a single button dialing key 6c to originate a call according to the second embodiment will be explained with reference to the flowchart in FIG. 8. The portable telephone apparatus, once powered on (step 101), enters the call incoming wait state (step 102). In this state, when the key operation area is pressed, a decision is made about whether the key is pre-registered a single button dialing telephone number or not (step 103). In case not, it is assumed that a signal pertinent to the key is input, awaiting next entry (step 104). Next, in case the key is not a call origination key, execution awaits next entry; in case the key is a call origination key, a call is originated (step 105).

In case a decision is made that a single button dialing telephone number is pre-registered to the key in step 103, the timer starts when the key is pressed (step 106). In case the key is not held down for a predetermined period (Ti), an ordinary entry procedure is assumed where keys are sequentially pressed such as entry of a telephone number and input of a signal pertinent to the key is assumed, awaiting next entry (step 104). In case the key is held down for the predetermined period (T1), an operation to instruct single button dialing via a so-called hold-down operation is assumed, thus causing the single button dialing telephone number pre-registered to the key held down to appear on the display (step 108).

When a predetermined period (T2) has elapsed with the key held down (step 109), an operation to instruct a call origination to the telephone number on the display is assumed and a call is originated then conversation starts depending on the answer of the distant party (step 110). After that, when the call release key is pressed (step 111), the call is released (step 12). While step 108 is followed by step 109 in the flowchart, step 109 may be omitted and step 108 may be directly followed by step 110.

Thus, when a key to which a single button dialing telephone number is pre-registered is held down for a least a predetermined period, a so-called hold-down state, the display shows the single button dialing telephone number then a call is originated. On the other hand, when keys are sequentially pressed such as in entering a telephone number, an ordinary operation such as entry of a telephone number is assumed and input of a signal inherently assigned to the key is assumed.

Thus, without using a switch for detecting opening/closing of the sliding cover, holding down a single button dialing key from the external surface of the sliding cover allows call origination to the corresponding single button dialing telephone number. With the sliding cover open, the user can sequentially pressing keys to enter a telephone number.

As mentioned earlier, the portable telephone apparatus according to the invention secures call origination to a desired distant party among a small number of distant parties pre-registered via a simple operation of holding down one of the three single button dialing keys 6c provided on the external surface of the cover for at least a predetermined period. Telephone numbers of the distant parties can be checked via a simple operation, by holding down the corresponding key until target data is displayed.

While the foregoing embodiment of the invention assumes a sliding cover as an openable cover, single button dialing keys may be provided on the external surface of a flip-type openable cover. In case a cover is not equipped, registering a single button dialing telephone number to each of the ten-digit keys can utilize as many single button dialing telephone numbers as the number of keys in two applications: hold-down operation or not.

Further, like the single button dialing detail display key 6d, another operation feature of single button dialing detail display triggered by holding down the key which is different from instantaneous push on the key may be pre-registered for the controller 22 to perform predetermined operation.

As mentioned earlier, portable telephone apparatus according to the first aspect of the invention is adapted to originate a call to a distant party of the pre-registered telephone number registered by holding down a single button dialing key for at least a predetermined period, thereby providing an advantage of originating a call to a pre-registered distant party via a simple operation.

Portable telephone apparatus according to the second aspect of the invention is equipped with single button dialing keys on the external surface of its openable cover so that single button dialing keys may be operated while the cover is closed, thereby providing an advantage of originating a call by using single button dialing keys while the cover is closed.

Portable telephone apparatus according to the third aspect of the invention detects closing of the cover from the open state or opening of the cover from the closed state to perform pre-registered operations, thereby providing an advantage of performing a desired operation by simply opening or closing the cover.

Portable telephone apparatus according to the fourth aspect of the invention detects opening of the sliding cover from the closed state to reduce the volume of ringing, thereby providing an advantage of quickly reducing ringing that offends those around the user by opening the cover.

Portable telephone apparatus according to the fifth aspect of the invention detects opening of the sliding cover from the closed state to illuminate the display means, thereby providing an advantage of illuminating the display means by opening the cover.

Portable telephone apparatus according to the sixth aspect of the invention detects closing of the sliding cover from the open state to perform call release operation, thereby providing an advantage of performing call release operation by closing the cover.

Portable telephone apparatus according to the seventh aspect of the invention is adapted so that the cover opening/closing state detecting means is composed of a combination of a lead switch and a magnet and that the magnet comes in close proximity to the lead switch to turn on the lead switch when the cover is closed, thereby providing an advantage of detecting closing of the cover from the open state and opening of the cover from the closed state.

As mentioned earlier, the eighth aspect of the invention is a control method for portable telephone apparatus, characterized in that an operation key which is pre-assigned an input signal is further assigned a single button dialing telephone number separately from said input signal, that said input signal is assumed to be input when said operation key is held down shorter than a predetermined period, and that a single button dialing instruction signal is assumed to be input when said operation key is held down longer than the predetermined period to originate a call to a pre-registered single button dialing telephone number. Via this configuration, it is possible to originate a call to a pre-registered distant party via a simple operation.

The ninth aspect of the invention is a control method for portable telephone apparatus, characterized in that an operation key which is pre-assigned an input signal is further assigned a single button dialing telephone number separately from said input signal, that said input signal is assumed to be input when said operation key is held down shorter than a first predetermined period (T1), that a single button dialing instruction signal is assumed to be input when said operation key is held down longer than the first predetermined period (T1) to display a pre-registered single button dialing telephone number, and that a call is originated to the displayed single button dialing telephone number when a second predetermined period (T2) has elapsed after the elapse of said first predetermined period (T1). Via this configuration, it is possible to automatically display a registered single button dialing telephone number and to originate a call to the displayed single button dialing telephone number in a sequence, by the elapse of the period the operation key is held down.

The tenth aspect of the invention is portable telephone apparatus controlled by the control method according to the first or second aspect of the invention. Via this configuration, it is possible to provide portable telephone apparatus whereby it is possible to originate a call easily by using single button dialing keys.

The eleventh aspect of the invention is portable telephone apparatus according to the third aspect of the invention, characterized in that the control means comprises an enclosure having an openable cover, transmitter means, receiver means, radio communications means, key entry means, storage means, and display means, that said openable cover is equipped with a pressing area to press the key entry means provided on said enclosure from the cover surface, and that a call is originated to a pre-registered single button dialing telephone number by holding down an operation key to which the single button dialing telephone number is registered apart from said input signal, via said pressing area of the cover while the cover is closed. Via this configuration, it is possible to originate a call to a pre-registered single button dialing telephone number while the cover is closed.

What is claimed is:

1. A portable telephone apparatus comprising:
    means for radio communication, said means for radio communication including a transmitter and a receiver;
    a body, said body including a plurality of first key entry means; and
    a cover slidably connected to said body, said cover having one or more second key entry means, each of said one or more second key entry means capable of activating a corresponding one of said first key entry means when said cover is in a closed position; and
    cover opening/closing state detecting means, wherein at least one operation is performed when said cover opening/closing state detecting means detects that said cover is slid opened or slid closed, and further wherein said at least one operation is programmable by a user.

2. A portable telephone apparatus comprising:
    means for radio communication, said means for radio communication including a transmitter and a receiver;
    a body, said body including a plurality of first key entry means;
    a cover moveably connected to said body, said cover having a plurality of second key entry means, each of said second key entry means capable of activating a corresponding one of said first key entry means when said cover is in a closed position; and
    cover opening/closing state detecting means;
    wherein at least one operation is performed when said cover opening/closing state detecting means detects that said cover is slid opened or slid closed, and further wherein said at least one operation is programmable by a user.

3. The portable telephone apparatus of claim 2, said cover opening/closing detecting means including a magnet and a means for detecting said magnet.

4. The portable telephone apparatus of claim 2, wherein said cover is slidably connected to said body.

5. The portable telephone apparatus of claim 2, said body further including a first microphone and said cover further including a second microphone.

6. The portable telephone apparatus of claim 2, further comprising a display, wherein some portion of said first key entry means can be registered with a corresponding phone number, and further wherein, if one of said some portion of said first key entry means is activated for more than a first time period, the corresponding phone number is displayed on said display, and still further wherein, if said one of said some portion of said first key entry means is activated for more than a second time period, said corresponding phone number is connected.

7. The portable telephone apparatus of claim 2, wherein said one operation is reducing a volume of a ringing tone when said cover opening/closing state detecting means detects that said cover is opened.

8. The portable telephone apparatus of claim 2, wherein said one operation is illuminating a display means when said cover opening/closing state detecting means detects that said cover is opened.

9. The portable telephone apparatus of claim 2, wherein said one operation is performing a call release operation when said cover opening/closing state detecting means detects that said cover is closed.

10. A portable telephone apparatus comprising:
    means for radio communication, said means for radio communication including a transmitter and a receiver;
    a body, said body including a plurality of first key entry means;
    a cover moveably connected to said body, said cover having a plurality of second key entry means, each of said second key entry means capable of activating a corresponding one of said first key entry means when said cover is in a closed position; and
    cover opening/closing state detecting means;

wherein a first operation is performed when said cover opening/closing state detecting means detects that said cover is opened, and wherein a second operation is performed when said cover opening/closing state detecting means detects that said cover is closed, and further wherein said at first operation is programmable by a user and said second operation is also programmable by the user.

11. The portable telephone apparatus of claim 10, further comprising a display, wherein some portion of said first key entry means can be registered with a corresponding phone number, and further wherein, if one of said some portion of said first key entry means is activated for more than a first time period, the corresponding phone number is displayed on said display, and still further wherein, if said one of said some portion of said first key entry means is activated for more than a second time period, said corresponding phone number is connected.

12. The portable telephone apparatus of claim 10, wherein said first operation is reducing a volume of a ringing tone.

13. The portable telephone apparatus of claim 10, wherein said first operation is illuminating a display means.

14. The portable telephone apparatus of claim 10, wherein said second operation is performing a call release operation.

* * * * *